(12) United States Patent
Katano et al.

(10) Patent No.: US 8,741,497 B2
(45) Date of Patent: Jun. 3, 2014

(54) FUEL CELL SYSTEM AND FUEL CELL HYBRID VEHICLE

(75) Inventors: Koji Katano, Toyota (JP); Nobutaka Teshima, Kariya (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 700 days.

(21) Appl. No.: 12/515,574

(22) PCT Filed: Nov. 14, 2007

(86) PCT No.: PCT/JP2007/072486
§ 371 (c)(1),
(2), (4) Date: May 20, 2009

(87) PCT Pub. No.: WO2008/062806
PCT Pub. Date: May 29, 2008

(65) Prior Publication Data
US 2010/0062319 A1   Mar. 11, 2010

(30) Foreign Application Priority Data
Nov. 24, 2006   (JP) .................................. 2006-317071

(51) Int. Cl.
*H01M 8/04* (2006.01)
(52) U.S. Cl.
USPC ............. 429/428; 429/34; 429/411; 429/423; 429/444; 429/443; 429/454
(58) Field of Classification Search
USPC ................. 429/411, 423, 443, 454; 261/119.2
See application file for complete search history.

(56) References Cited

U.S. PATENT DOCUMENTS

| 5,496,228 A * | 3/1996 | Takata et al. ................... 477/107 |
| 6,294,277 B1 * | 9/2001 | Ueno et al. ..................... 429/413 |
| 2005/0139402 A1 * | 6/2005 | Yamashita ..................... 180/65.3 |
| 2006/0037588 A1 * | 2/2006 | Osanai .......................... 123/520 |

FOREIGN PATENT DOCUMENTS

| DE | 103 19 920 A1 | 5/2004 |
| DE | 103 46 208 A1 | 4/2005 |
| JP | 62-78467 A | 4/1987 |
| JP | 7-320763 A | 12/1995 |
| JP | 07-320763 A | 12/1995 |
| JP | 8-315840 A | 11/1996 |
| JP | 2000-323157 A | 11/2000 |
| JP | 2001-6697 A | 1/2001 |

(Continued)

OTHER PUBLICATIONS

JP2005-310718 (machine translation.*

(Continued)

*Primary Examiner* — Patrick Ryan
*Assistant Examiner* — Alex Usyatinsky
(74) *Attorney, Agent, or Firm* — Kenyon & Kenyon LLP

(57) ABSTRACT

A fuel cell system having a hydrogen supply path for supplying a hydrogen gas to a fuel cell, an injector which is provided in the hydrogen supply path and which regulates the pressure of the gas on the upstream side of the hydrogen supply path to inject the pressure-regulated hydrogen gas to the downstream side of the hydrogen supply path, and a surge tank 81 which is provided in the hydrogen supply path on the upstream side from the injector and which suppresses the fluctuation of the pressure of the gas in the hydrogen supply path.

7 Claims, 5 Drawing Sheets

(56) References Cited

FOREIGN PATENT DOCUMENTS

| | | |
|---|---|---|
| JP | 2001-006697 A | 1/2001 |
| JP | 2001-069614 A | 3/2001 |
| JP | 2002-081597 A | 3/2002 |
| JP | 2003-065171 A | 3/2003 |
| JP | 2003-178783 A | 6/2003 |
| JP | 2004-189585 A | 7/2004 |
| JP | 2005-310718 * | 11/2004 |
| JP | 2004-342479 A | 12/2004 |
| JP | 2004-352511 A | 12/2004 |
| JP | 2005-302563 A | 10/2005 |
| JP | 2005-302571 A | 10/2005 |
| JP | 2005-310718 A | 11/2005 |
| JP | 2006-216283 A | 8/2006 |
| JP | 2005-035450 A | 2/2007 |

OTHER PUBLICATIONS

Webster's dictionary definition.*
Webster's dictionary (1913 issue) definition, cited from 1913 issue.*
JP 2005-310718 ( machine translation, done on Nov. 24, 2011).*
Translation of Office Action mailed May 10, 2013 in DE 11 2007 002813.4.

* cited by examiner

FUEL CELL SYSTEM AND FUEL CELL HYBRID VEHICLE

This a 371 national phase application of PCT/JP2007/072486 filed 14 Nov. 2007, which claims priority to Japanese Patent Application No. 2006-317071 filed 24 Nov. 2006, the contents of which are incorporated herein by reference.

TECHNICAL FIELD

The present invention relates to a fuel cell system including a variable gas supply device in a supply path for allowing a fuel gas supplied from a fuel supply source to flow into a fuel cell, and a fuel cell hybrid vehicle.

BACKGROUND ART

In recent years, a fuel cell system has been suggested in which a variable gas supply device such as a mechanical variable regulator or an injector is provided in a fuel supply path for allowing a fuel gas (e.g., a hydrogen gas) supplied from a fuel supply source such as a fuel tank to flow into a fuel cell, whereby the supply pressure of the fuel gas from the fuel supply source can be changed in accordance with the operation state of the system (e.g., see Japanese Patent Application Laid-Open No. 2005-302571).

DISCLOSURE OF THE INVENTION

However, in the above fuel cell system, when an injector is driven, pulsation is generated in a fuel gas in a fuel supply path. Therefore, this pulsation causes vibration in a fuel supply pipe which connects a fuel tank to a fuel cell, and this pulsation is propagated to a member for fixing the fuel supply pipe, or the fuel tank to generate noise sometimes. In, for example, a fuel cell hybrid vehicle, the vibration or noise generated by the pulsation of the fuel gas is transmitted to the interior of the vehicle through the fuel supply pipe, or a frame to which the fuel tank is fixed sometimes.

Moreover, in the conventional fuel cell system, the injector is disposed away from a pressure sensor provided in the fuel supply path, and hence there is a deviation between the actual injection timing of the injector and the injection timing of the injector detected based on the measurement result of the pressure sensor, or the variation of a gas pressure detected based on the measurement result of the pressure sensor becomes smaller than that of the gas pressure of the fuel supply path just before the injector sometimes, and there is a problem that it is difficult to precisely control the injector.

The present invention has been developed in view of the above situation, and an object thereof is to provide a fuel cell system in which even when a variable gas supply device is driven, pulsation is not easily generated in a fuel gas, whereby the generation of vibration or noise caused by the pulsation of the fuel gas can be suppressed, and to provide a fuel cell hybrid vehicle.

Another object of the present invention is to provide a fuel cell system which correctly measures the gas state (e.g., a gas pressure) of a fuel supply path on the upstream side from the variable gas supply device without any time delay, whereby the variable gas supply device can precisely be controlled, and to provide a fuel cell hybrid vehicle.

To achieve the above objects, the fuel cell system of the present invention comprises a fuel cell; a fuel gas supply path which allows a fuel gas supplied from a fuel supply source to flow into the fuel cell; a variable gas supply device which regulates the state of the gas on the upstream side of the fuel gas supply path to supply the gas to the downstream side; and a surge tank which is provided in the fuel gas supply path on the upstream side from the variable gas supply device and which suppresses the fluctuation of the pressure of the gas in the fuel gas supply path.

Moreover, the fuel cell system of the present invention comprises a fuel cell; a fuel gas supply path which allows a fuel gas supplied from a fuel supply source to flow into the fuel cell; a variable gas supply device which regulates the state of the gas on the upstream side of the fuel gas supply path to supply the gas to the downstream side; and an expanded transverse sectional portion disposed in the fuel gas supply path on the upstream side from the variable gas supply device, wherein the expanded transverse sectional portion has at least a larger transverse section than on the upstream side thereof.

According to this constitution, even when the variable gas supply device is driven, the fluctuation of the gas state caused by the driving is absorbed by the surge tank or the expanded transverse sectional portion, so that any pulsation is not easily generated in the fuel gas of the fuel gas supply path, and the generation of vibration or noise caused by the pulsation of the fuel gas is suppressed.

In the fuel cell system of the present invention, the surge tank may be disposed just on the upstream side of the variable gas supply device.

According to this constitution, even when the pulsation is caused by the driving of the variable gas supply device, the pulsation is immediately decreased by the surge tank, and the generation of the vibration or noise on the upstream side from the surge tank is suppressed.

In the fuel cell system of the present invention, an inflow port of the fuel gas of the surge tank may be provided in parallel with an outflow port of the fuel gas of the surge tank so that the inflow direction of the fuel gas into the inflow port is opposite to the outflow direction of the fuel gas through the outflow port.

According to this constitution, as compared with a case where the gas inflow direction into the inflow port agrees with or is parallel to the gas outflow direction through the outflow port, a large effective capacity of the surge tank is secured, and hence a pulsation suppressing effect produced by the surge tank improves. In consequence, the generation of the vibration or noise is noticeably suppressed.

In the fuel cell system of the present invention, the inflow port of the fuel gas of the surge tank may be provided with an orifice.

According to this constitution, when the fuel gas passes through the orifice, the impact of the pulsation is absorbed, and hence the pulsation suppressing effect produced by the surge tank further improves. In consequence, the generation of the vibration or noise is noticeably suppressed.

In the fuel cell system of the present invention, the surge tank may include a plate-like member integrally constituted of a variable gas supply device fixing portion which fixes the variable gas supply device to the surge tank and a surge tank fixing portion which fixes the surge tank to a support member.

According to this constitution, the variable gas supply device is integrated with the surge tank, so that when the variable gas supply device and the surge tank are fixed to the support member of, for example, the fuel cell or the like, an assembling precision among parts improves.

That is, when the variable gas supply device and the surge tank are individually fixed to the support member, a deviation is generated between the variable gas supply device and the surge tank by a difference between the assembling precision of the variable gas supply device with respect to the fuel cell and the assembling precision of the surge tank with respect to the fuel cell, and the variable gas supply device might not properly be engaged with the surge tank. On the other hand, according to the constitution of the present invention, since the variable gas supply device is integrated with the surge tank and the surge tank integrated with the variable gas supply device is fixed to the fuel cell, any deviation is not generated between the variable gas supply device and the surge tank. Therefore, the variable gas supply device is properly engaged with the surge tank.

In the fuel cell system of the present invention, the wall face of the surge tank facing the variable gas supply device may be provided with a protruding portion or a recessed portion.

According to this constitution, the rigidity of the wall face of the surge tank increases. Therefore, even when the energy of the fuel gas flowing into the surge tank is strong, the generation of the vibration in the wall face of the surge tank is suppressed.

In the fuel cell system of the present invention, the surge tank may be provided with a pressure sensor which measures the pressure of the fuel gas.

According to this constitution, the variable gas supply device is disposed closer to the pressure sensor, and hence any deviation is not easily generated between the actual injection timing of the variable gas supply device and the injection timing of the variable gas supply device detected based on the measurement result of the pressure sensor. In addition, the variation of the gas pressure detected based on the measurement result of the pressure sensor is substantially equal to that of the gas pressure of the fuel gas supply path just before the variable gas supply device. Therefore, the variable gas supply device can precisely be controlled based on the measurement result of the pressure sensor.

The fuel cell hybrid vehicle of the present invention comprises a fuel cell; a fuel gas supply path which allows a fuel gas supplied from a fuel supply source to flow into the fuel cell; a variable gas supply device which regulates the state of the gas on the upstream side of the fuel gas supply path to supply the gas to the downstream side; and a surge tank which is provided in the fuel gas supply path on the upstream side from the variable gas supply device and which suppresses the fluctuation of the pressure of the gas in the fuel gas supply path, wherein the surge tank is disposed between the variable gas supply device and a passenger space.

According to this constitution, the surge tank functions as a sound insulator or a sound absorber. Therefore, even when the noise is generated in the variable gas supply device, the propagation of the noise to the passenger space is suppressed.

According to the present invention, even when the variable gas supply device is driven, the pulsation is not easily generated in the fuel gas, and hence the generation of the vibration or noise caused by the pulsation of the fuel gas can be suppressed. The gas pressure of a hydrogen supply path on the upstream side from the variable gas supply device can correctly be measured without any time delay, whereby the variable gas supply device can precisely be controlled.

BEST MODE FOR CARRYING OUT THE INVENTION

Next, a first embodiment of a fuel cell system according to the present invention will be described. Hereinafter, there will be described a case where this fuel cell system is applied to a car-mounted power generation system of a fuel cell hybrid vehicle, but the present invention is not limited to such an application example, and can be applied to all mobile bodies such as a ship, an airplane, a train and a walking robot and a stational power generation system in which a fuel cell is used as, for example, a power generation facility for a construction (a housing, a building or the like).

Figure 1:
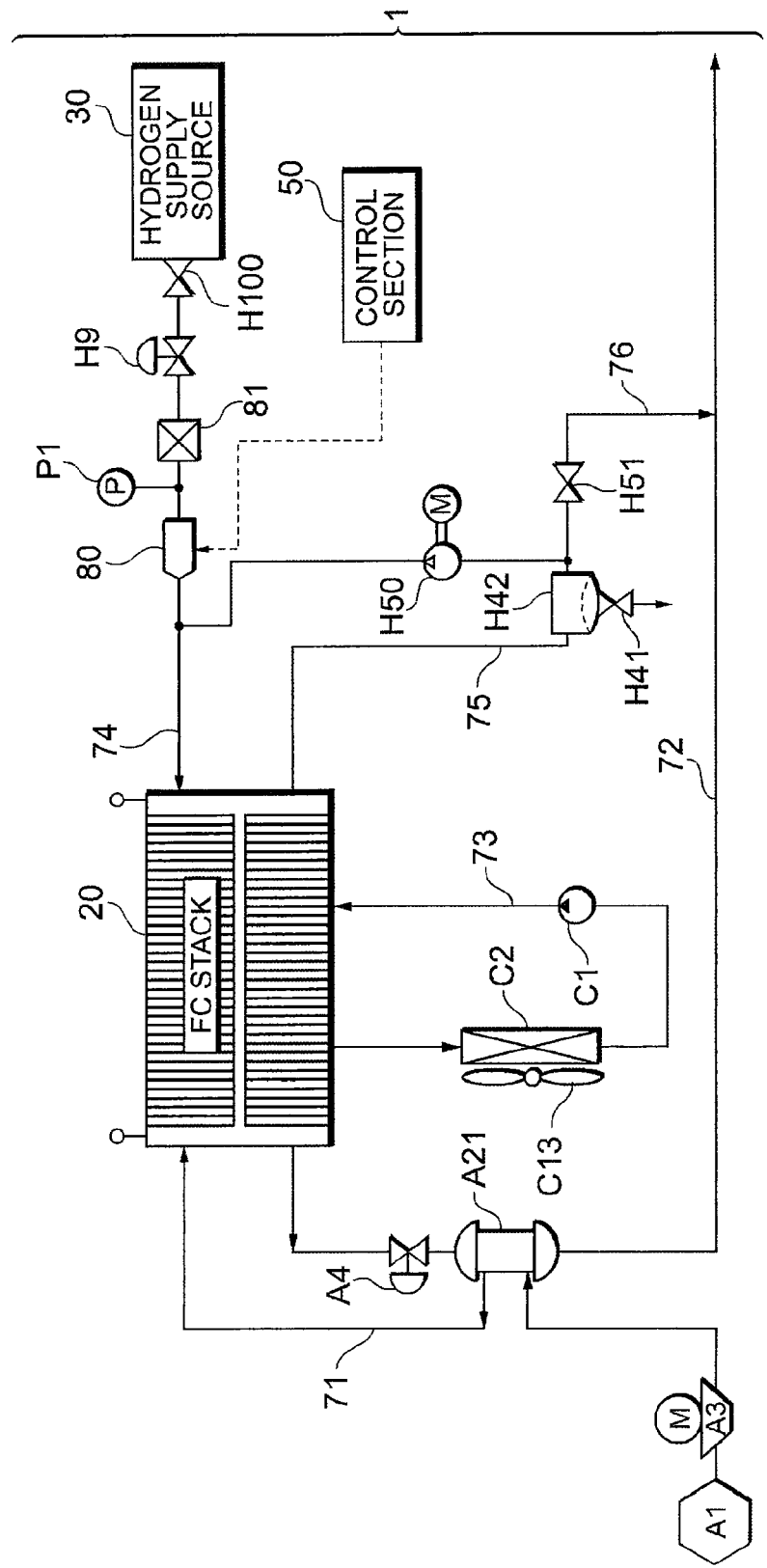
FIG. 1 is a schematic diagram showing a first embodiment of a fuel cell system according to the present invention.

In a fuel cell system 1 shown in FIG. 1, air as an oxidizing gas (outside air, a humidified gas) is supplied to an air supply port of a fuel cell 20 through an air supply path 71. The air supply path 71 is provided with an air filter A1 which removes fine particles from the air, a compressor A3 which pressurizes the air, and a humidifier A21 which adds a required water content to the air. The air filter A1 is provided with an air flow meter (not shown) which detects the flow rate of the air. The compressor A3 is driven by a motor M.

An air off gas (an oxidizing off gas) discharged from the fuel cell 20 is discharged to the outside through an exhaust path 72. The exhaust path 72 is provided with a pressure regulation valve A4 and the humidifier A21. The pressure regulation valve A4 functions as a pressure regulation unit which sets the pressure of the air to be supplied to the fuel cell 20.

A hydrogen gas as a fuel gas is supplied from a hydrogen supply source 30 to a hydrogen supply port of the fuel cell 20 through a hydrogen supply path 74. The hydrogen supply source 30 corresponds to, for example, a high-pressure tank of hydrogen, but a so-called fuel reformer, a hydrogen-gas absorbing alloy tank or the like may be used.

The hydrogen supply path 74 is provided with a cutoff valve H100 which supplies hydrogen from the hydrogen supply source 30 or stops the supply, a hydrogen pressure regulation valve H9 which reduces the pressure of the hydrogen gas to be supplied to the fuel cell 20 to regulate the pressure, a pressure sensor P1 which measures the pressure of the hydrogen gas in the hydrogen supply path 74, and an injector (a variable gas supply device) 80.

Figure 2:
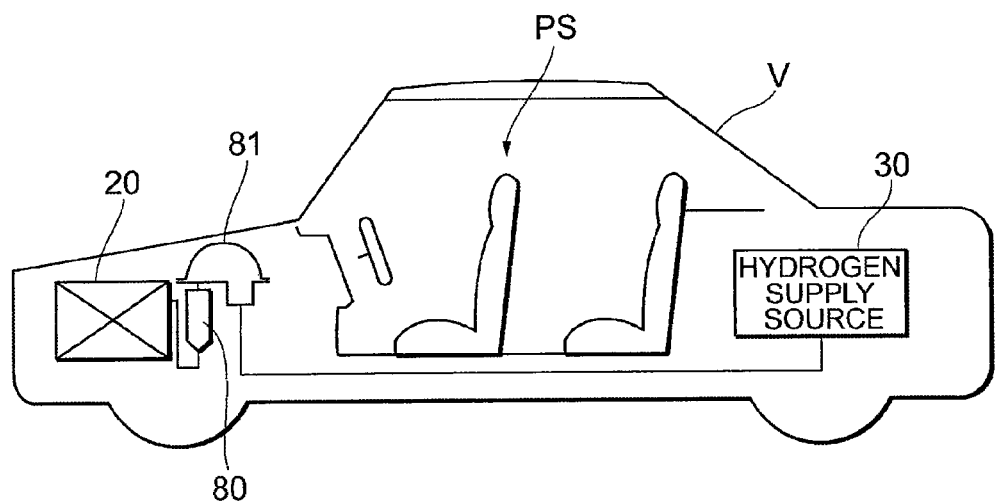
FIG. 2 is a schematic diagram of a fuel cell hybrid vehicle in which the fuel cell system of the first embodiment is mounted.

The injector 80 has both a function of a flow rate regulation valve and a function of a variable pressure regulation valve, and controls a stoichiometric ratio and a back pressure by both the functions. Moreover, a surge tank 81 for suppressing the fluctuation of the gas pressure of the hydrogen supply path 74 is provided in the hydrogen supply path 74 on the upstream side from the injector 80. As shown in FIG. 2, the surge tank 81 is disposed between the injector 80 and a passenger space PS of a fuel cell hybrid vehicle V.

The hydrogen gas, which has not been consumed by the fuel cell 20, is discharged as a hydrogen off gas (a fuel off gas) to a hydrogen circulation path 75, and returned to the hydrogen supply path 74 on the downstream side of the hydrogen pressure regulation valve H9. The hydrogen circulation path 75 is provided with a gas-liquid separation device H42 which collects a water content from the hydrogen off gas, a water discharge valve H41 which collects a product water to discharge the water to a tank (not shown) or the like through the hydrogen circulation path 75, and a hydrogen pump H50 which pressurizes the hydrogen off gas.

A cutoff valve H21 closes the anode side of the fuel cell 20. The operation of the hydrogen pump H50 is controlled by a control section 50, so that the hydrogen gas can be supplied to the fuel cell 20 through the hydrogen supply path 74 or the hydrogen gas can be supplied to the fuel cell 20 through the hydrogen supply path 74 and the hydrogen circulation path 75. The hydrogen off gas joins the hydrogen gas in the hydrogen supply path 74, is supplied to the fuel cell 20 and is reused.

The hydrogen circulation path 75 is connected to the exhaust path 72 on the downstream side of the humidifier A21 via a discharge control valve H51 by a purge passage 76. The discharge control valve H51 is an electromagnetic cutoff valve, and is operated in accordance with a command from the control section 50 to discharge (purge), to the outside, the hydrogen off gas together with the air off gas discharged from the fuel cell 20. When this purge operation is intermittently performed, it is possible to prevent a cell voltage from being lowered by the increase of the concentration of impurities in the hydrogen gas.

A cooling water outlet/inlet of the fuel cell 20 is provided with a cooling path 73 for circulating cooling water. The cooling path 73 is provided with a radiator (a heat exchanger) C2 which radiates the heat of the cooling water to the outside, and a pump C1 which pressurizes and circulates the cooling water. Moreover, the radiator C2 is provided with a cooling fan C13 which is driven and rotated by a motor.

The fuel cell 20 has a constitution of a fuel cell stack in which the required number of unitary cells are stacked to receive a supplied hydrogen gas and air, thereby generating a power by an electrochemical reaction. The power generated by the fuel cell 20 is supplied to a power control unit (not shown). The power control unit includes an inverter which supplies the power to a vehicle driving motor, an inverter which supplies the power to various auxiliary apparatus such as a compressor motor and a motor for a hydrogen pump, a DC-DC converter which charges accumulator means such as a secondary battery or which supplies the power from the accumulator means to the motors and the like.

The control section 50 is constituted of a control computer system provided with a known constitution including a CPU, an ROM, an RAM, an HDD, an input/output interface, a display and the like, and the control section receives a required load such as an accelerator signal of a vehicle (not shown), and control information from sensors (a pressure sensor, a temperature sensor, a flow rate sensor, an output ammeter, an output voltmeter, etc.) for the parts of the fuel cell system 1, to control the operation of the valves or motors of the system parts.

The injector 80 includes injection holes for injecting a gas fuel such as the hydrogen gas, and also includes a nozzle body which supplies and guides the gas fuel to the injection holes, and a valve disc movably received and held in an axial direction (a gas flow direction) with respect to this nozzle body to open/close the injection holes.

The valve disc of the injector 80 is driven by, an electromagnetic driving force generated by supplying the power to, for example, a solenoid. When a pulsed excitation current supplied to this solenoid is turned on/off, the opening area (the opening state) of the injection holes can be switched to a multistage manner of two or more stages, or a stepless manner. When the gas injection time and gas injection timing of the injector 80 are controlled by a control signal output from the control section 50, the flow rate and pressure of the hydrogen gas are precisely controlled.

Figure 3:
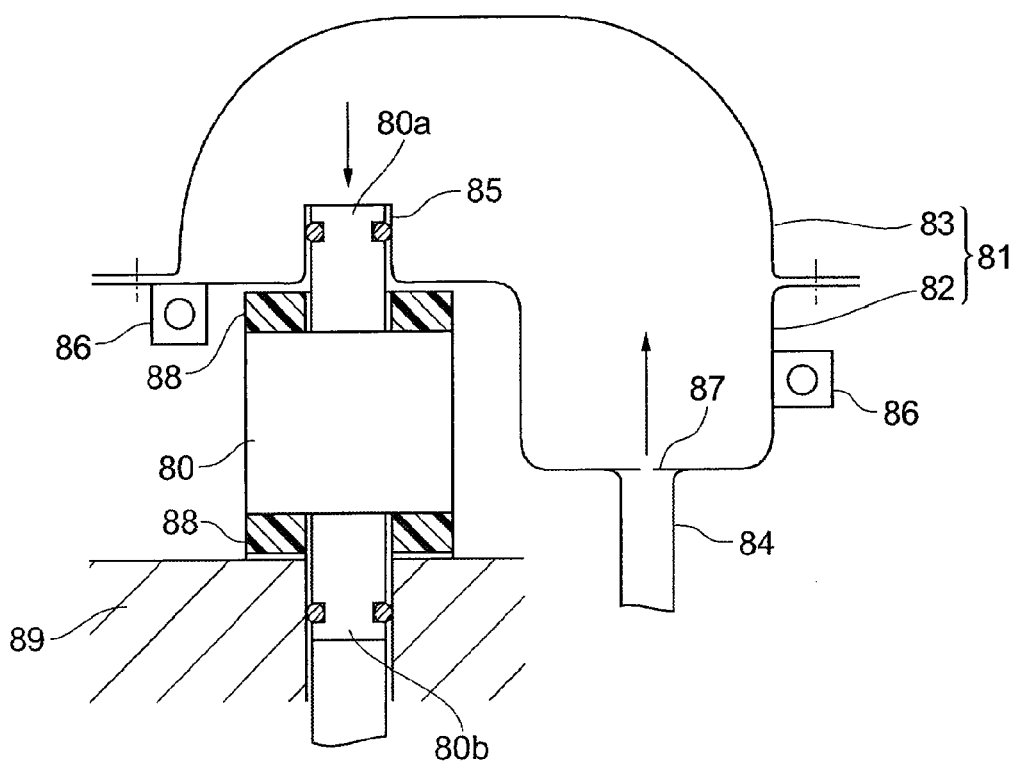
FIG. 3 is a diagram showing the first embodiment of the fuel cell system according to the present invention, and is a sectional view of a surge tank.

As shown in FIG. 3, the surge tank 81 abuts on the injector 80 and is disposed just on the upstream side of the injector. The surge tank 81 is constituted of a plate-like lower member (a plate-like member) 82 partially having a dome portion, and a dome-like upper member 83. That is, the surge tank 81 is provided in the hydrogen supply path 74 on the upstream side from the injector 80, and is constituted as an expanded transverse sectional portion having an expanded transverse section larger than a transverse section on the upstream side of the surge tank 81.

The upper member 83 is disposed so as to fall downward on the lower member 82, and the peripheries of both the members are joined to each other in an airtight manner. Each of the lower member 82 and the upper member 83 is processed by punching a thin plate made of a metal. The lower member 82 includes an inflow port 84 of the hydrogen gas, an outflow port 85 of the hydrogen gas and brackets (surge tank fixing portions) 86 for fixing the surge tank 81 to the fuel cell 20.

The inflow port 84 is provided in parallel with the outflow port 85 so that the inflow direction of the hydrogen gas into the inflow port 84 is reverse to and opposite to the outflow direction of the hydrogen gas through the outflow port 85. The inflow port 84 is provided with an orifice 87. The outflow port 85 constitutes an injector fixing portion for fixing the injector 80 to surge tank 81. More specifically, the outflow port 85 is formed into a cylindrical shape so that the outflow port protrudes into the surge tank 81, and the inner diameter of the outflow port 85 is substantially equal to the outer diameter of an inflow port 80a of the injector 80.

While a mount 88 constituted of an elastic member is sandwiched between the injector 80 and the surge tank 81, the inflow port 80a of the injector 80 is fitted into the outflow port 85 of the surge tank 81, whereby the injector is integrally fixed to the surge tank 81. Moreover, while another mount 88 is sandwiched between the injector 80 and a support member 89 integrated with the fuel cell 20, the surge tank 81 is fixed to an end plate (not shown) of the fuel cell 20 via the brackets 86, whereby the injector is disposed in a fixed position on the support member 89.

The fitting of the inflow port 80a of the injector 80 into the outflow port 85 of the surge tank 81, and the fitting of an outflow port 80b of the injector 80 into the support member 89 are strictly managed. In consequence, a gap between the injector 80 and the surge tank 81 is sealed in an airtight manner.

In the fuel cell system 1 having the above constitution, the hydrogen gas supplied from the hydrogen supply source 30 flows into the surge tank 81 through the inflow port 84, changes its flow direction so as to U-turn while flowing along the inner surface of the dome-like upper member 83, and flows into the injector 80.

According to the above fuel cell system 1, the surge tank 81 for suppressing the fluctuation of the gas pressure of the hydrogen supply path 74 is provided. Therefore, even when the injector 80 is driven, any pulsation is not easily generated in the hydrogen gas of the hydrogen supply path 74, and the generation of the vibration or noise caused by the pulsation of the hydrogen gas is suppressed. In particular, the surge tank 81 is disposed just on the upstream side of the injector 80. Therefore, even when the pulsation is caused by the driving of the injector 80, the pulsation is instantly decreased by the surge tank 81, and the generation of the vibration or noise on the upstream side from the surge tank 81 is suppressed.

Moreover, since the inflow port 84 of the surge tank 81 is disposed in parallel with the outflow port 85 of the same tank and the inflow direction of the hydrogen gas into the inflow port 84 is opposite to the outflow direction of the hydrogen gas through the outflow port 85, as compared with a case where the gas inflow direction agrees with or is parallel to the gas outflow direction, the stagnation of the hydrogen gas is not easily generated in the surge tank 81, and a large effective capacity of the surge tank 81 is secured. Therefore, a pulsation suppressing effect produced by the surge tank 81 improves. In consequence, the generation of the vibration or noise is noticeably suppressed.

Furthermore, while the hydrogen gas passes through the orifice 87 of the inflow port 84, the impact of the pulsation is absorbed, so that the pulsation suppressing effect produced by the surge tank further improves. In consequence, the generation of the vibration or noise is further noticeably suppressed.

In addition, since the injector 80 is integrated with the surge tank 81 and the surge tank 81 is fixed to the end plate of the fuel cell 20 via the brackets 86, the assembling precision among the parts improves. More specifically, when the injector 80 and the surge tank 81 are individually fixed to the fuel cell 20, a deviation is generated between the injector 80 and the surge tank 81 by a difference between the assembling precision of the injector 80 with respect to the fuel cell 20 and the assembling precision of the surge tank 81 with respect to the fuel cell 20, and the injector 80 might not properly be engaged with the surge tank 81.

However, since the injector 80 is integrated with the surge tank 81 and the surge tank 81 integrated with the injector 80 is fixed to the fuel cell 20, any deviation is not generated between the injector 80 and the surge tank 81. Therefore, the injector 80 is properly engaged with the surge tank 81. Moreover, since the deviation of the injector 80 from the surge tank 81 and the deviation of the injector 80 from the support member 89 are not generated, distortion generated in the mount 88 is homogenized. In consequence, the performance of the mount is not impaired.

Figure 4:
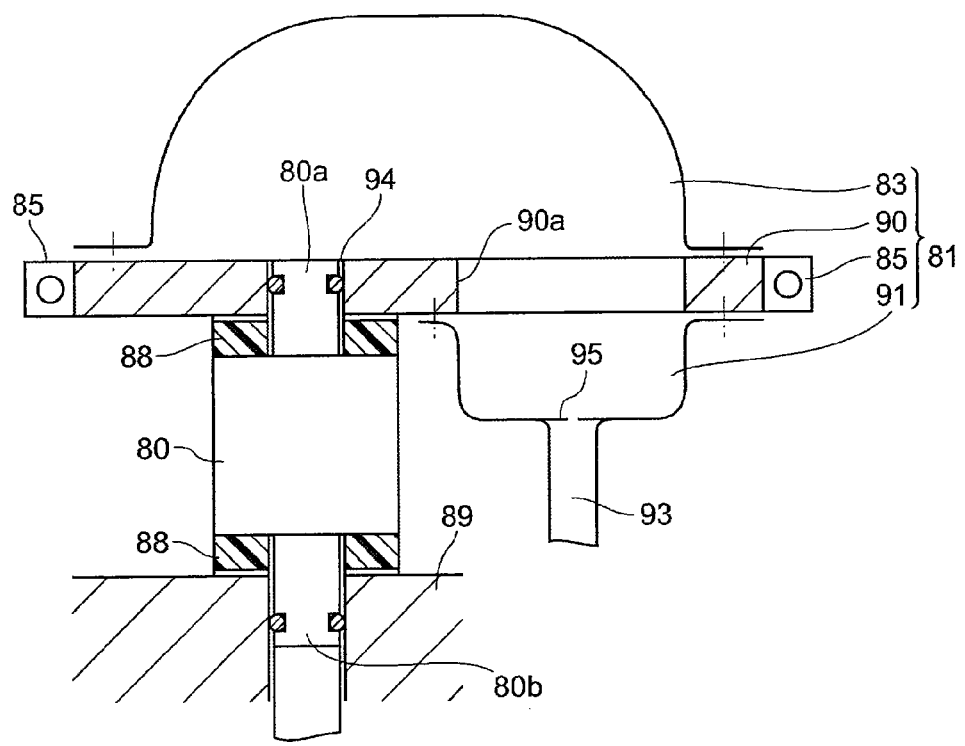
FIG. 4 is a diagram showing a modification of the first embodiment of the fuel cell system according to the present invention, and is a sectional view of a surge tank.

It is to be noted that in the fuel cell system 1 of the present embodiment, each of the upper member 83 and the lower member 82 constituting the surge tank 81 is processed by punching the thin plate made of the metal, but as shown in FIG. 4, the surge tank 81 may be constituted of three members, that is, the upper member 83, an intermediate plate-like member 90 and a lower member 91. The intermediate plate-like member 90 is cut from a thick plate made of a metal, and the lower member 91 is processed by punching a thin plate made of a metal in the same manner as in the upper member 83.

The plate-like member 90 is provided with an inflow port 93 of the hydrogen gas, an outflow port 94 of the hydrogen gas and brackets 95 for fixing the surge tank 81 to the fuel cell 20. Moreover, the plate-like member 90 is provided with a through hole 90a which connects a space partitioned by the upper member 83 to a space partitioned by the lower member 91.

Moreover, the inflow port 93 is provided in parallel with the outflow port 94 so that the inflow direction of the hydrogen gas into the inflow port 93 is opposite to the outflow direction of the hydrogen gas through the outflow port 94. The inflow port 93 is provided with an orifice 95.

According to such a constitution, since the plate-like member 90 cut from the thick metal plate is employed in a part constituting the surge tank 81, the rigidity of the wall face of the surge tank 81 improves, so that even when the energy of the hydrogen gas flowing into the surge tank 81 is strong, the generation of the vibration in the wall face of the surge tank 81 is suppressed. Therefore, the generation of the vibration or noise caused by the pulsation of the hydrogen gas is suppressed.

Next, a second embodiment of the fuel cell system according to the present invention will be described. It is to be noted that constitutional requirements already described above in the first embodiment are denoted with the same reference numerals, and the description thereof is omitted.

Figure 5:
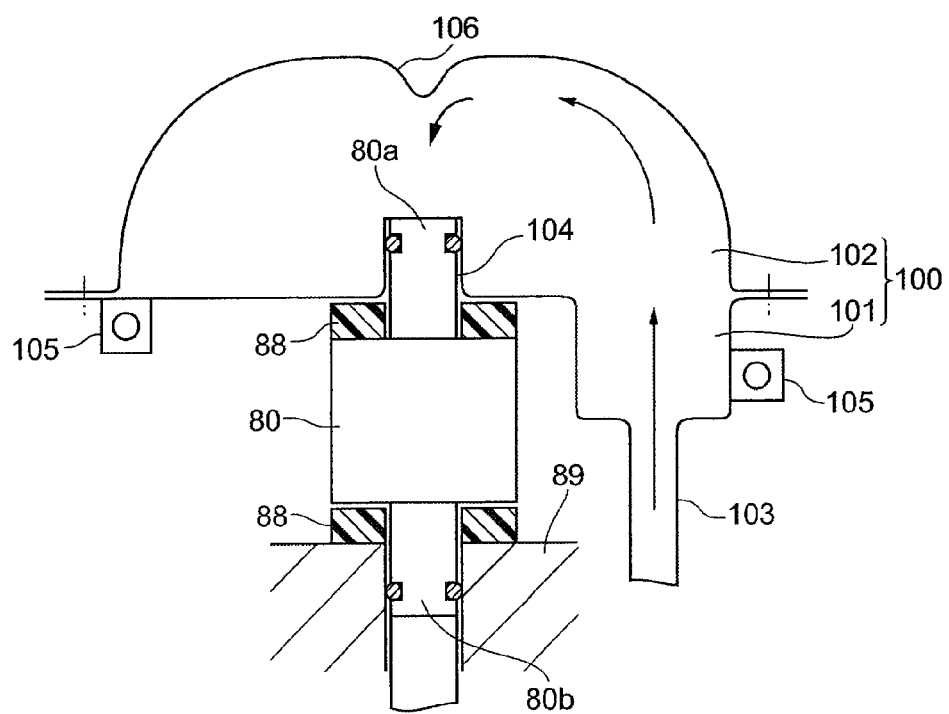
FIG. 5 is a diagram showing a second embodiment of the fuel cell system according to the present invention, and is a sectional view of a surge tank.

As shown in FIG. 5, a surge tank 100 of the present embodiment abuts on an injector 80, and is disposed just on the upstream side of the injector, and the surge tank is constituted of a lower member (a plate-like member) 101 partially having a dome portion, and a dome-like upper member 102. The upper member 102 is disposed so as to fall downward on the lower member 101, and the peripheries of both the members are joined to each other in an airtight manner. Each of the lower member 101 and the upper member 102 is processed by punching a thin plate made of a metal.

Moreover, the lower member 101 includes an inflow port 103 of a hydrogen gas, an outflow port 104 of the hydrogen gas and brackets (surge tank fixing portions) 105 for fixing the surge tank 100 to a fuel cell 20.

The upper member 102 is provided with a recessed portion 106 which is recessed inwardly from the surge tank 100. The recessed portion 103 is formed simultaneously when the upper member 102 is processed by the punching. The recessed portion 106 is formed substantially in the center of the upper member 102, and is coaxially disposed right above the injector 80 while the injector 80 and the surge tank 100 are mounted in predetermined positions of a fuel cell hybrid vehicle.

In the fuel cell system having the above constitution, the hydrogen gas supplied from a hydrogen supply source 30 flows into the surge tank 100 through the inflow port 103, flows along the inner surface of the dome-like upper member 102, changes its flow direction so as to U-turn along the recessed portion 106 protruding into the surge tank 100, and flows into the injector 80.

According to the fuel cell system having the above constitution, the rigidity of the wall face of the surge tank 100 increases, so that even when the energy of the hydrogen gas flowing into the surge tank 100 is strong, the generation of vibration in the wall face of the surge tank 100 is suppressed. In consequence, the generation of the vibration or noise caused by the pulsation of the hydrogen gas is suppressed.

It is to be noted that in the present embodiment, the upper member 102 is provided with the recessed portion 106 which is recessed inwardly from the surge tank 100, but the upper member 102 may be provided with a protruding portion which protrudes externally from the surge tank 100. In addition, the upper member 102 may be provided with a concentric circle-like recessed/protruding portion so that the upper member 102 has a wave-like vertical sectional shape. In this case, the recessed/protruding portion is preferably formed so that the center of the recessed/protruding portion is disposed substantially just on the upstream side of the injector 80.

Next, a third embodiment of the fuel cell system according to the present invention will be described. It is to be noted that constitutional requirements already described above in the second embodiment are denoted with the same reference numerals, and the description thereof is omitted.

Figure 6:
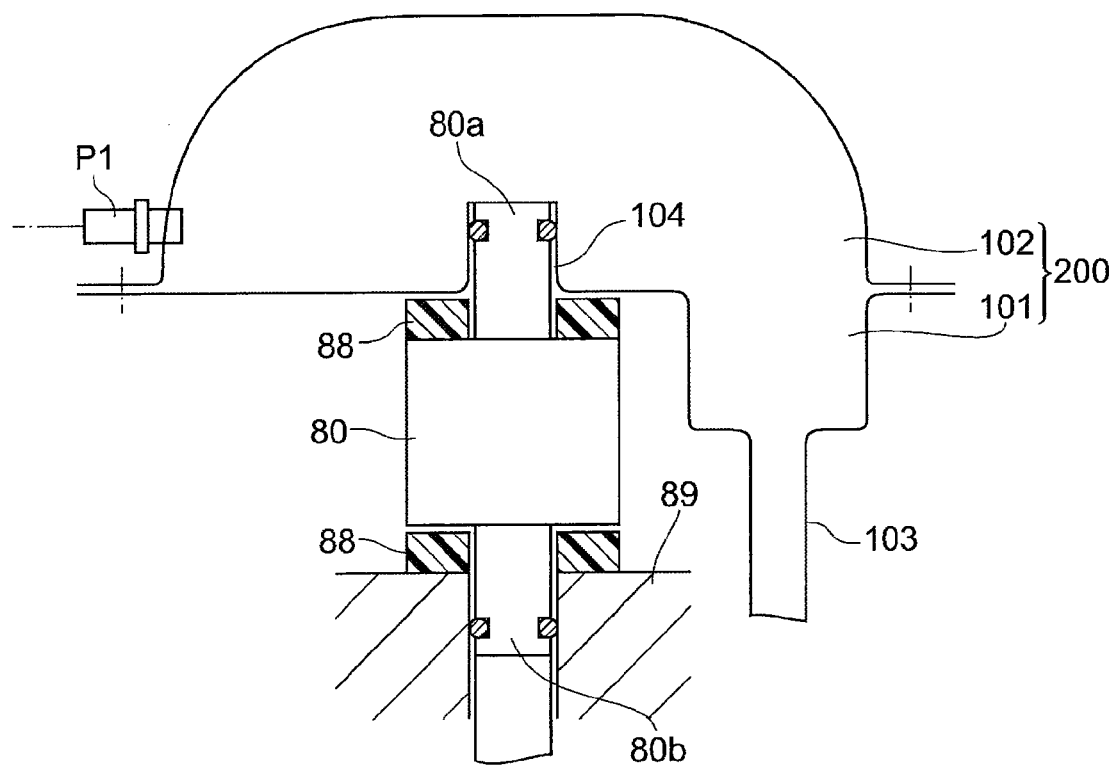
FIG. 6 is a diagram showing a third embodiment of the fuel cell system according to the present invention, and is a sectional view of a surge tank.

As shown in FIG. 6, in a surge tank 200 of the present embodiment, a pressure sensor P1 is disposed. The pressure sensor P1 is provided in a position which is substantially symmetric with respect to an inflow port 84 while an outflow port 85 is disposed between the sensor and the inflow port, so as to protrude from the wall face of an upper member 83 into a surge tank 81. It is to be noted that the upper member 102 is not provided with any protruding portion 106.

Figure 7:
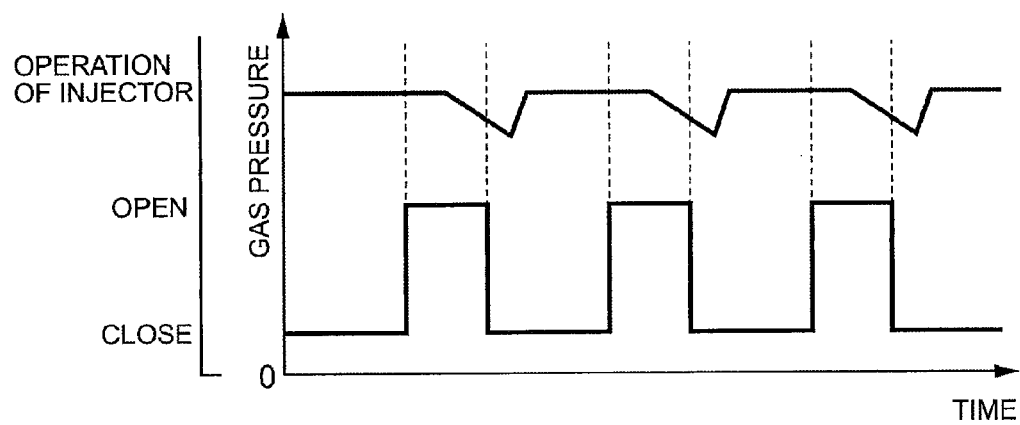
FIG. 7 is a diagram for use in comparison with a third embodiment of the fuel cell system according to the present invention, and is a graph showing a relation between the actual injection timing of an injector and the injection timing of the injector detected based on the measurement result of a pressure sensor in a conventional fuel cell system.

In a conventional fuel cell system, the injector is away from the pressure sensor of the hydrogen supply path, so that, as shown in FIG. 7, a deviation is generated sometimes between the actual injection timing of the injector and the injection timing of the injector detected based on the measurement result of the pressure sensor.

That is, the injection timing of the injector detected based on the measurement result of the pressure sensor is behind the actual injection timing sometimes. In addition, the variation of the gas pressure detected based on the measurement result of the pressure sensor becomes smaller than that of the gas pressure of the hydrogen supply path just before the injector sometimes.

Figure 8:
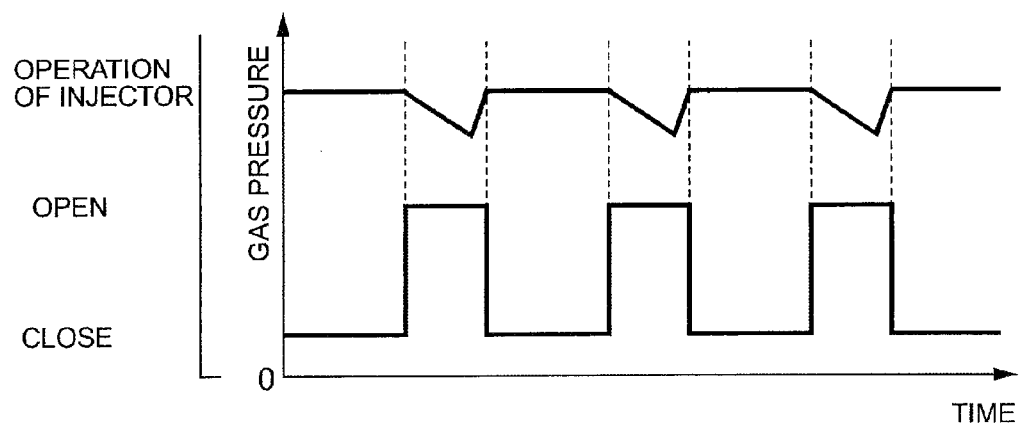
FIG. 8 is a diagram for explaining the third embodiment of the fuel cell system according to the present invention, and is a graph showing a relation between the actual injection timing of an injector and the injection timing of the injector detected based on the measurement result of a pressure sensor in the fuel cell system of the present embodiment.

On the other hand, according to the fuel cell system of the present embodiment, since the pressure sensor P1 is directly attached to the surge tank 81 disposed just on the upstream side of the injector 80, as shown in FIG. 8, any deviation is not easily generated between the actual injection timing of the injector 80 and the injection timing of the injector 80 detected based on the measurement result of the pressure sensor P1.

In addition, the variation of the gas pressure detected based on the measurement result of the pressure sensor P1 is substantially equal to that of the gas pressure of the hydrogen supply path 74 just before the injector 80. Therefore, the injector 80 can precisely be controlled based on the measurement result of the pressure sensor P1.

Moreover, the pressure sensor P1 is provided in the position which is substantially symmetric with respect to the inflow port 84 while the outflow port 85 is disposed between the sensor and the inflow port, so that the sensor is not easily influenced by the fluctuation of the pressure of the hydrogen gas flowing through the surge tank 200. Therefore, the pressure can more correctly be measured.

The invention claimed is:

1. A fuel cell system comprising:
a fuel cell;
a fuel gas supply path which allows a fuel gas supplied upstream from a fuel supply source to flow downstream into the fuel cell;
a variable gas supply device which regulates the gas pressure on the upstream side of the fuel gas supply path and which injects and supplies the fuel gas to the downstream side of the fuel gas supply path; and
a surge tank which is provided in the fuel gas supply path on the upstream side from the variable gas supply device and which suppresses the fluctuation of the pressure of the gas in the fuel gas supply path,
wherein the variable gas supply device is an electromagnetic driving type on-off valve which is detached from a valve seat when a valve disc is driven by an electromagnetic driving force at a predetermined driving period,
wherein an inflow port of the fuel gas of the surge tank is provided in parallel with an outflow port of the fuel gas of the surge tank,
wherein the inflow direction of the fuel gas into the inflow port is opposite to the outflow direction of the fuel gas through the outflow port; and
wherein the inflow port is disposed on the upstream side of the outflow port.

2. The fuel cell system according to claim 1, wherein the surge tank is disposed on the upstream side of the variable gas supply device.

3. The fuel cell system according to claim 1, wherein the inflow port of the fuel gas of the surge tank is provided with an orifice.

4. The fuel cell system according to claim 1, wherein the surge tank includes a plate integrally constituted of a variable gas supply device fixing portion which fixes the variable gas supply device to the surge tank and a surge tank fixing portion which fixes the surge tank to a support member.

5. The fuel cell system according to claim 1, wherein the wall face of the surge tank facing the variable gas supply device is provided with a protruding portion or a recessed portion.

6. The fuel cell system according to claim 1, wherein the surge tank is provided with a pressure sensor which measures the pressure of the fuel gas.

7. The fuel cell system according to claim 1, wherein the variable gas supply device and the surge tank are integrally assembled.

* * * * *